(12) United States Patent
Fan et al.

(10) Patent No.: US 7,577,483 B2
(45) Date of Patent: Aug. 18, 2009

(54) AUTOMATIC TUNING METHOD FOR MULTIVARIABLE MODEL PREDICTIVE CONTROLLERS

(75) Inventors: Junqiang Fan, Vancouver (CA); Gregory E. Stewart, Vancouver (CA)

(73) Assignee: Honeywell ASCA Inc., Mississauga, Ontario (CA)

( * ) Notice: Subject to any disclaimer, the term of this patent is extended or adjusted under 35 U.S.C. 154(b) by 0 days.

(21) Appl. No.: 11/442,572

(22) Filed: May 25, 2006

(65) Prior Publication Data

US 2007/0276512 A1 Nov. 29, 2007

(51) Int. Cl.
*G06F 19/00* (2006.01)
(52) U.S. Cl. .......................... 700/29; 702/150
(58) Field of Classification Search ............... 700/37, 700/36, 45, 122, 127–129, 28–29, 31, 73–74, 700/67, 51–53; 702/15, 23, 198, 150, 12; 703/12; 162/192
See application file for complete search history.

(56) References Cited

U.S. PATENT DOCUMENTS

| | | | |
|---|---|---|---|
| 5,347,446 A | 9/1994 | Iino et al. | |
| 5,351,184 A | 9/1994 | Lu et al. | |
| 5,572,420 A | 11/1996 | Lu | |
| 5,574,638 A | 11/1996 | Lu | |
| 5,893,055 A | 4/1999 | Chen | |
| 6,086,237 A | 7/2000 | Gorinevsky et al. | |
| 6,233,495 B1 * | 5/2001 | Chen | 700/122 |
| 6,245,581 B1 * | 6/2001 | Bonser et al. | 438/8 |
| 6,253,113 B1 | 6/2001 | Lu | |
| 6,466,839 B1 * | 10/2002 | Heaven et al. | 700/128 |
| 6,807,510 B1 | 10/2004 | Backstrom et al. | |
| 6,819,964 B2 | 11/2004 | Harmse | |
| 6,826,521 B1 | 11/2004 | Hess et al. | |
| 6,988,017 B2 * | 1/2006 | Pasadyn et al. | 700/121 |

OTHER PUBLICATIONS

Fan J et al., Two-Dimensional Frequency Analysis for Unconstrained Model Predictive Control of Cross-Directional Processes, Automatica, Pergamon, vol. 40, No. 11, Nov. 2004.

Lee J H et al., Tuning of Model Predictive Controllers for Robust Performance, Computers & Chemical Engineering, vol. 18, No. 1, Jan. 1994, pp. 15-37.

Trierweiler et al, RPN Tuning Strategy for Model Predictive Control, Journal of Process Control, [Online] vol. 13 (2003), 2002, pp. 591-598.

(Continued)

*Primary Examiner*—Kidest Bahta
(74) *Attorney, Agent, or Firm*—Cascio Schmoyer & Zervas (57) ABSTRACT

A fast and reliable technique for tuning multivariable model predictive controllers (MPCs) that accounts for performance and robustness is provided. Specifically, the technique automatically yields tuning weights for the MPC based on performance and robustness requirements. The tuning weights are parameters of closed-loop transfer functions which are directly linked to performance and robustness requirements. Automatically searching the tuning parameters in their proper ranges assures that the controller is optimal and robust. This technique will deliver the traditional requirements of stability, performance and robustness, while at the same time enabling users to design their closed-loop behavior in terms of the physical domain. The method permits the user to favor one measurement over another, or to use one actuator more than another.

16 Claims, 4 Drawing Sheets

OTHER PUBLICATIONS

Vilanova R et al., Observer-controller configuration Approach to Controller Robustification, Proceedings of the 38th IEEE Conf., Dec. 1999, USA, vol. 1, pp. 74-75.

Shridhar and Cooper, "ATuning strategy for unconstrained multivariable model predictive control," Industrial & Eng. Chem. & Research, vol. 37, No. 10, 4003-4016, 1998.

Dougherty & Cooper, "Tuning guidelines of a dynamic matrix controller for integrating (non-self-regulating) processes," Industrial & Eng. Chem. Res, v. 42, No. 8, 1739-52, 2003.

Rani & Unbehauen, "Study of predictive controller tuning methods," Automatica, vol. 33, No. 12, 2243-2248, 1997.

Al-Ghazzawi et al., "On-line tuning strategy for model predictive controllers," J. of Process Control, vol. 11, No. 3, 265-284, 2001.

Trierweiler & Farina, "RPN tuning strategy for model predictive control," J. of Process Control, vol. 13, No. 7, 591-598, 2003.

Lee & Yu, Tuning of Model Predictive Controllers For Robust Performance, Automatica 1997, 2243-2248, vol. 33 No. 12.

* cited by examiner

AUTOMATIC TUNING METHOD FOR MULTIVARIABLE MODEL PREDICTIVE CONTROLLERS

FIELD OF THE INVENTION

The present invention generally relates to techniques for monitoring and controlling multivariable systems and more specifically to techniques for automatically tuning multivariable model predictive controllers (MPCs) which take into account performance and robustness requirements.

BACKGROUND OF THE INVENTION

In MPC applications, there is a set of tuning parameters used to tune the closed-loop response for acceptable performance. Multivariable MPCs have many applications including controlling paper machine processes. Suitable paper machine processes where paper is continuously manufactured from wet stock are further described, for instance, in U.S. Pat. No. 6,805,899 to MacHattie et al., U.S. Pat. No. 6,466,839 to Heaven et al., U.S. Pat. No. 6,149,770, to Hu et al., U.S. Pat. No. 6,092,003 to Hagart-Alexander et al, U.S. Pat. No. 6,080,278 to Heaven et al., U.S. Pat. No. 6,059,931 to Hu et al., U.S. Pat. No. 5,853,543 to Hu et al., and U.S. Pat. No. 5,892,679 to He, which are all assigned to Honeywell International, Inc. and are incorporated herein by reference.

Figure 1:
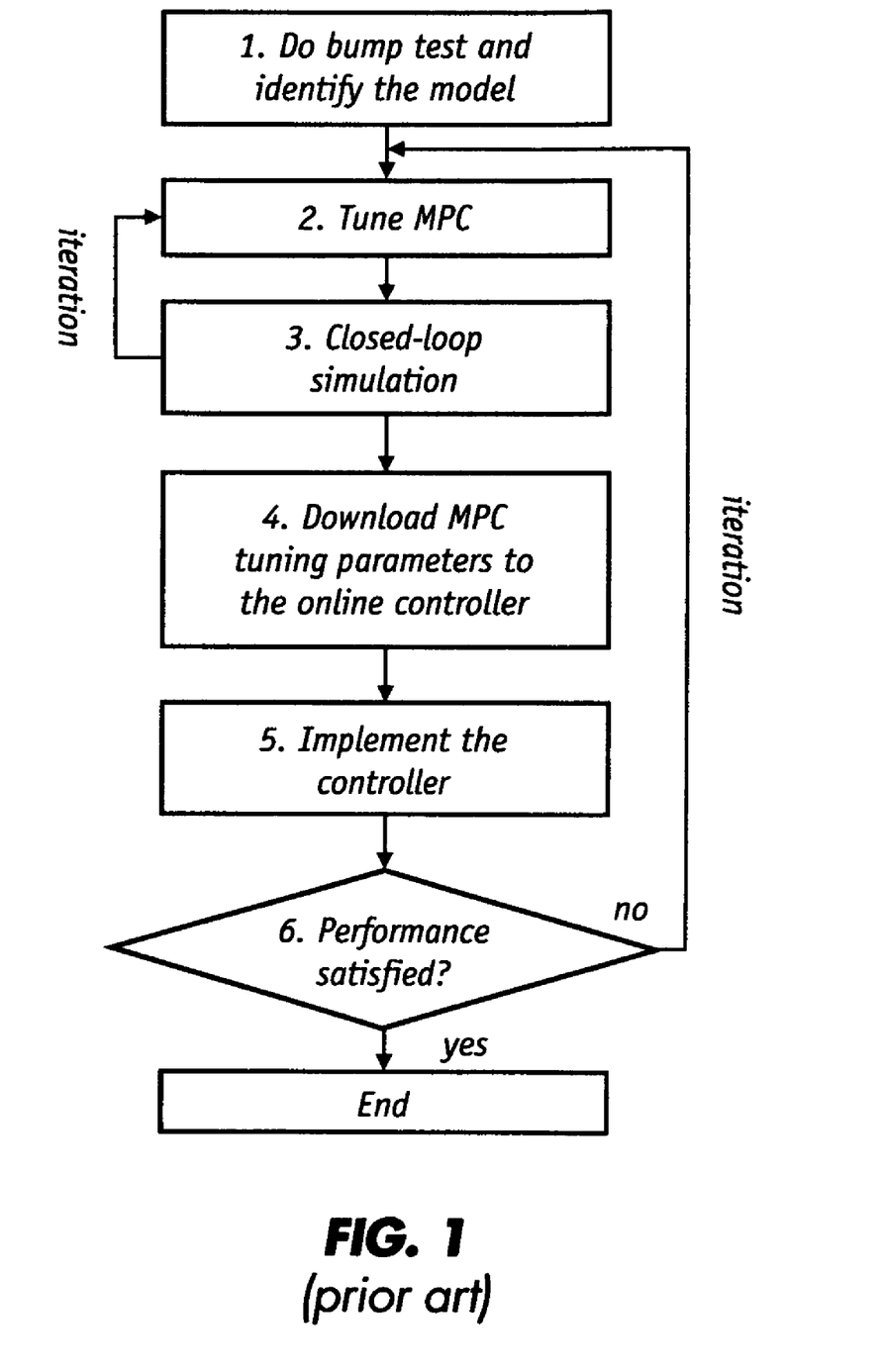
FIG. 1 is a prior art procedure for implementation of an MPC.

The typical procedure for implementing an MPC control system which is shown in FIG. 1 begins with identifying the process model. For papermaking process, this can be accomplished with bump tests. A multivariable MPC usually has a group of tuning parameters, such as prediction horizon, control horizon and weights. Typically, these parameters are adjusted via a trial and error procedure depicted as steps 2 through 6 in FIG. 1. This trial and error procedure requires a large amount of simulations based on some tuning guidelines. This cumbersome tuning procedure usually takes a lot of time especially for tuning a multivariable MPC, due to the overlapping effect of the tuning parameters and multiple interactive responses between the inputs and outputs. In addition, this traditional tuning procedure usually does not consider the evitable process/model mismatch. Further, if a process model is ill-conditioned, the tuning task can be very challenging, as the closed-loop system can be easily unstable and the actuators are very likely to become saturated with a typical MPC design. Another practical issue with prior art tuning methods is that there is no indication whether the controller is robustly stable for inevitable model uncertainties.

In control engineering, many requirements are often defined via the singular value decomposition and in the frequency domain, where the necessary requirements of nominal stability, robust stability, and nominal performance are often defined. On the other hand, there are additional practical closed-loop requirements that are typically specified in the physical domain. In multivariable control these physical requirements can include the specification of the relative importance of the measured variables or a specification on the relative usage of actuators. With current tuning techniques, there is no assurance that the controller's performance and robustness. The controller may be too conservative and work sub-optimally or too aggressive for multivariable systems. There is a need for a consistent automated tuning method for multivariable MPC that is readily implemented and achieves good controller performance and robustness.

In R. Shridhar and D. J. Cooper, "A tuning strategy for unconstrained multivariable model predictive control," *Industrial & Engineering Chemistry & Research*, vol. 37, no. 10, pp 4003-4016, 1998 and D. Dougherty and D. J. Cooper, "Tuning guidelines of a dynamic matrix controller for integrating (non-self-regulating) processes," *Industrial & Engineering Chemistry & Research*, vol. 42, no. 8, pp 1739-1752, 2003, the authors proposed some tuning guidelines for multivariable dynamic matrix controllers. In K. Y. Rani and H. Unbehauen, "Study of predictive controller tuning methods," *Automatica*, vol. 33, no 12, pp 2243-2248, 1997, the authors proposed tuning procedures for predictive controllers that are based on some tuning rules and closed-loop simulations. In J. H. Lee and Z. Yu, "Tuning of model predictive controllers for robust performance," *Computers & Chemical Engineering*, vol. 18, no. 1, pp. 15-37, 1994, tuning rules based on the frequency-domain analysis of the closed-loop behavior of MPC controllers are presented. In A. Al-Ghazzawi, et al., "On-line tuning strategy for model predictive controllers," *Journal of Process Control*, vol. 11, no. 3, pp. 265-284, 2001, an on-line tuning strategy for linear model predictive control algorithms is proposed based on the linear approximation between the closed-loop predicted output and the MPC tuning parameters. J. Trierweiler and L. A. Farina, "RPN tuning strategy for model predictive control," *Journal of Process Control*, vol. 13, no. 7, pp. 591-598, 2003, presented a tuning strategy based on robust performance number for multiple-input multiple-output (MIMO) MPC. However these are not automatic tuning techniques considering both performance and robust stability.

SUMMARY OF THE INVENTION

The present invention is directed to a fast and reliable technique, for automatic tuning multivariable model predictive controllers, which takes into consideration performance and robustness. Specifically, an aspect of the inventive tuning technique is that it automatically yields tuning weights for the MPC based on performance and robustness requirements. The tuning weights are parameters of closed-loop transfer functions which are directly linked to performance and robustness requirements. Automatically searching the tuning parameters in their proper ranges assures that the controller is optimal and robust. The inventive technique will deliver the traditional requirements of stability, performance and robustness, while at the same time enabling users to design their closed-loop behavior in terms of the physical domain. The method permits the user to favor one measurement (also known as controlled variable or CV) over another, or to use one actuator (also known as manipulated variable or MV) more than another.

In one embodiment, the invention is directed to a method of automatically tuning a multivariable model predictive controller (MPC) for a multivariable process whose behavior is based on a process model that contains model uncertainty wherein the MPC provides future predictions of multivariable process properties by solving an objection function that employs tuning weights, the method comprising designing tuning weights while respecting the robust stability condition where the model uncertainty is of a type that is other than additive unstructured uncertainty, such as multiplicative uncertainty.

In another embodiment, the invention is directed to a method of automatically tuning a multivariable model predictive controller (MPC) for a multivariable process that includes the steps of:

(a) identifying a process model for the multivariable process;

(b) calculating closed-loop transfer functions for performance and robustness as functions of tuning parameters for the MPC wherein the process model is used to calculate the closed-loop transfer functions or gain functions;

(c) identifying at least one performance requirement for the MPC and transforming the at least one performance requirement into constraints on frequency responses of the closed-loop transfer functions or gain functions;

(d) identifying at least one robustness requirement for the MPC and transforming the at least one robustness requirement into constraints on frequency responses of the closed-loop transfer functions or gain functions; and (e) determining optimal tuning parameters with respect to performance and robustness.

DETAILED DESCRIPTION OF PREFERRED EMBODIMENTS

Figure 2:
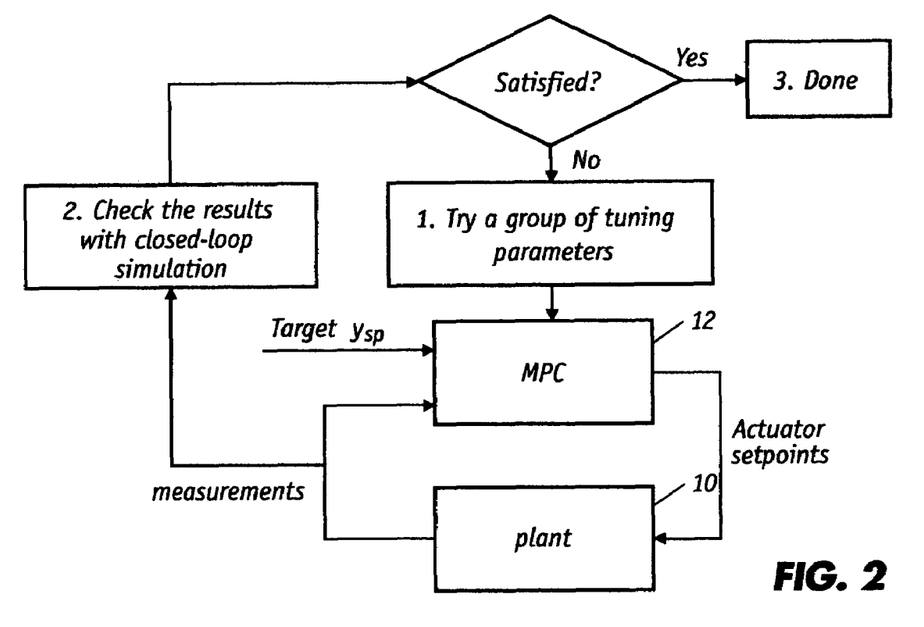
FIG. 2 is a block diagram showing a current tuning method for an MPC using a trial and error method.

FIG. 2 is a block diagram of an exemplary closed-loop control system in which the present invention may be utilized. In general, the plant 10 is controlled by the MPC 12 that takes measurements as inputs and generates outputs (actuator set points or positions). Target output properties or reference signals $y_{sp}$ are selected by the operator. As further described herein, the MPC has an object function in the form of a quadratic programming problem wherein the tuning parameters are matrices. In the prior art tuning process for the MPC, a group of tuning parameters are initially selected and manually set. Thereafter, a closed-loop simulation is executed and the results are analyzed. If the results are not satisfactory, this trial and error procedure is repeated using a new set of tuning parameters until the simulation yields the desired results. This prior art procedure typically does not adequately account for model uncertainty and is very dependent on the particular disturbances or inputs selected.

Figure 3:
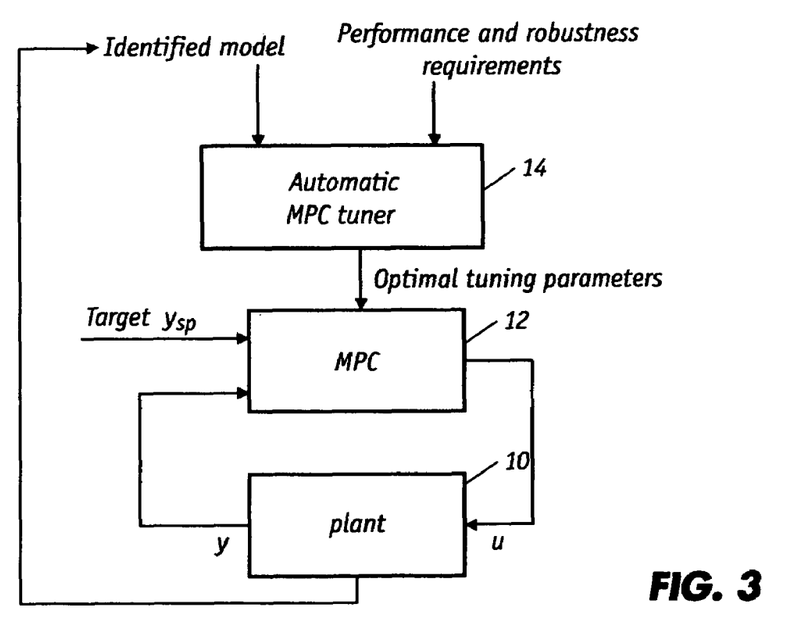
FIG. 3 is a block diagram showing an automated tuning method for an MPC.

FIG. 3 is a block diagram of a closed-loop control system that incorporates the inventive automated MPC tuner 14 for the MPC 12. The inventive method can automatically tune any suitable multivariable model predictive controller. MPCs are described, for example, in U.S. Pat. No. 5,351,184 to Lu, U.S. Pat. No. 5,561,599 to Lu, U.S. Pat. No. 5,574,638 to Lu, U.S. Pat. No. 5,572,420 to Lu et al., U.S. Pat. No. 6,807,510 to Backstrom and He, which are all incorporated herein by reference.

The automated MPC tuner 14 can output the optimal tuning parameters based on the identified model and performance and robustness requirements. For papermaking processes (plant 10), preferred techniques for implementing the model identification tool to identify the process model are to perform standard bump tests and model identification steps that are described, for example, in U.S. Pat. No. 6,086,237 to Gorinevsky and Heaven, which is incorporated herein by reference. Using the process model, easily adjustable tuning parameters can be automatically searched within possible pre-calculated ranges. The tuning parameters that are determined are then loaded to the MPC that controls the papermaking process. The inventive method assures that the controller is optimal and robust, that is, the control system can operate consistently under a variety of operating conditions. The design the automated MPC tuner 14 is described in detail as follows.

An MPC has multiple outputs, which are also the input variables u of the plant or target system, defined as $$u(k) = \begin{bmatrix} u_1(k) \\ u_2(k) \\ \vdots \\ u_m(k) \end{bmatrix}, \quad (1)$$

where u(k) at each discrete time, k=0, 1, 2, ...
The output variables of the plant are defined as:

$$y(k) = \begin{bmatrix} y_1(k) \\ y_2(k) \\ \vdots \\ y_n(k) \end{bmatrix}, \quad (2)$$

where y(k) at each discrete time, k=0, 1, 2, ... Therefore, the plant is a dynamic process G(z) having m input (or manipulated) variables and n controlled output variables, $$G(z) = \begin{bmatrix} g_{11}(z) & \cdots & g_{1m}(z) \\ \vdots & \ddots & \vdots \\ g_{n1}(z) & \cdots & g_{nm}(z) \end{bmatrix}, \quad (3)$$

where $g_{ij}(z)$ is a sub-process model.

In order to develop the inventive tuning algorithm, the inputs, outputs, and the process model G(z) in (3) are preferably scaled. After proper pre-processing, scaling can be accomplished by standard techniques which are described in, for example, U.S. Pat. No. 5,574,638 to Lu and assigned to Honeywell International, Inc, which is incorporated herein by reference.

The MPC 12 in FIG. 3 is designed with the following preferred quadratic programming (QP) problem:

$$\min_{\Delta u(k), \cdots, \Delta(k+H_c-1)} \sum_{i=1}^{H_P} \|\hat{y}(k+i) - y_{sp}(k+i)\|_\Gamma^2 + \quad (4)$$

$$\sum_{j=0}^{H_c-1} \|\Delta u(k+j)\|_\Lambda^2 + \|u(k+j) - u_{sp}(k+j)\|_\Phi^2$$

subject to:

$$A\Delta u(k) < b - Cu(k-1) \quad (5)$$

$$y(k) = G(q)u(k) + d(k) \quad (6)$$

where $y_{sp}$ is the reference signals, and $u_{sp}$ is the desired actuator positions, $H_p$ and $H_c$ are the prediction horizon and control horizon, respectively, $\|x\|_\Gamma^2$ denotes the weighted Euclidean norm of x defined as $\|x\|_\Gamma^2 = x^T \Gamma x$; $\Delta u(k) = (1-q^{-1})u$ (k)=u(k)−u(k−1), where q is the shift operator; the weights $\Gamma$, $\Lambda$, and $\Phi$ are positive semi-definite matrices (often diagonal) that are defined as:

$$\Gamma = \text{diag}(\gamma_1, \gamma_2, \ldots, \gamma_n), \quad (7)$$

$$\Lambda = \text{diag}(\lambda_1, \lambda_2, \ldots, \lambda_m), \quad (8)$$

$$\Phi = \text{diag}(\phi_1, \phi_2, \ldots, \phi_m). \quad (9)$$

In this embodiment, diagonal matrices for $\Gamma$, $\Lambda$, and $\Phi$ are employed for illustrative purposes; it is understood that the inventive technique can also cover non-diagonal, positive semi-definite matrices. The weight matrix $\Phi$ prevents the closed-loop system from becoming unstable when the plant G(z) is ill-conditioned and there is a mismatch between the process and the model. This will be described further below.

There is an inevitable level of model uncertainty associated with identifying a process. With the present invention, the true process model can be assumed to be a set of possible models which is employed in the closed-loop control system with an MPC 12 and unstructured additive model uncertainty $\Delta(z)$. The set of possible models are described by $$G_p(z) \in \prod := \left\{ G(z) + \Delta(z) : \max_{\forall \omega} \bar{\sigma}(\Delta(e^{j\omega})) \leq \beta \right\}, \quad (10)$$

where $\bar{\sigma}$ denotes the maximum singular value, $z = e^{j\omega}$ and the symbol $\omega$ represents the dynamical frequency, the symbol '$\forall \omega$' means for all the frequencies.

Typically, the prediction horizon $H_p$ and control horizon $H_c$ can be predetermined based on the process dynamics following known guidelines that are available in the published literature (See, e.g., R. Shidhar and D. J. Cooper's Ind. Eng. Chem. Res. 1998, No. 37, p. 4003-4016). For example, the prediction horizon $H_p$ should be equal to or close to the open-loop settling time of the slowest sub-process $g_{ij}(z)$ in (3) in samples, and the control horizon $H_c$ is typically selected as 60% time in samples of the slowest sub-process to reach steady-state. Therefore, the weights $\Gamma$, $\Lambda$, and $\Phi$ in (4) are used to tune MPC for satisfying the following three closed-loop requirements:

(1) disturbance rejection requirement;

(2) set point tracking requirement; and (3) the closed-loop system given by (4)-(6) is stable in the face of model uncertainty $\Delta(z)$ in (10).

Figure 4:
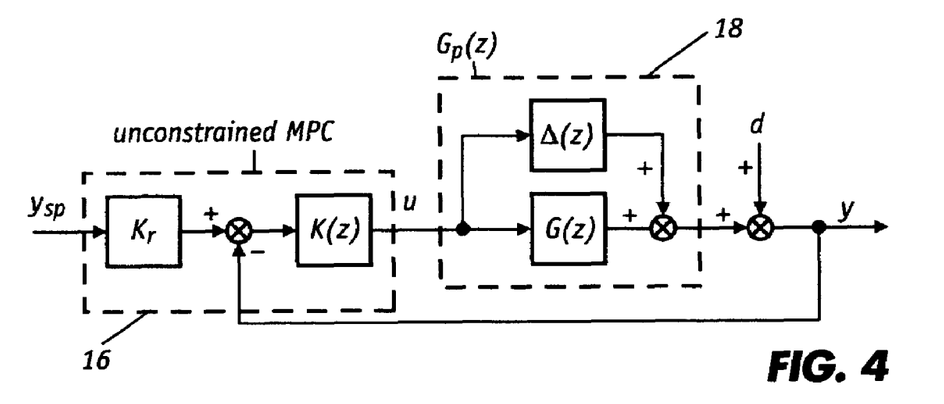
FIG. 4 is block diagram of a closed-loop control system with unconstrained MPC and unstructured additive model uncertainty.

Given that actuators are designed to operate within their ranges for most of the time, the MPC 12 is preferably approximated as a linear unconstrained controller. FIG. 4 is a block diagram of the closed-loop system with an unconstrained MPC 16 and a plant model 18 with additive model uncertainty $\Delta(z)$ in (10). The closed-loop transfer functions employed in FIG. 4 can be calculated to satisfy the above three closed-loop requirements as follows:

$$S(z) = (I + G(z)K(z))^{-1}, \quad (11)$$

$$T(z) = (I + G(z)K(z))^{-1}G(z)K(z)K_r, \quad (12)$$

$$R(z) = -K(z)(I + G(z)K(z))^{-1}, \quad (13)$$

where S(z) is the sensitivity function linking the disturbances d (which has the same dimensions as that of y in (2)) and the outputs y, T(z) is the closed-loop transfer function linking the targets $y_{sp}$ and the outputs y, and R(z) is the control sensitivity function linking the disturbances d and the actuators u. Calculating the constant prefilter matrix $K_r$ and complex transfer matrix K(z) for an unconstrained MPC in FIG. 4 is straightforward. (See, e.g., J. M. Maciejowski, Predictive Control with Constraints, Pearson Education, 2001). K(z) has the following format:

$$K(z) = \begin{bmatrix} k_{11}(z) & \ldots & k_{1n}(z) \\ \vdots & \ddots & \vdots \\ k_{m1}(z) & \ldots & k_{mn}(z) \end{bmatrix}. \quad (14)$$

Note that the closed-loop transfer functions S(z), T(z), and R(z) are functions of the tuning parameters $\Gamma$, $\Gamma$, and $\Phi$ in (4).

Due to the multiple inputs and outputs characteristic, the above closed-loop transfer functions can be very complex. In order to simplify the relationship between the inputs and outputs, it is preferred to use the following combined gain functions to replace the above closed-loop functions for evaluating the performance and robustness of the controller:

$$s(\omega) \begin{bmatrix} \|S(e^{j\omega})|_{1st\ row}\|_2 \\ \|S(e^{j\omega})|_{2nd\ row}\|_2 \\ \vdots \\ \|S(e^{j\omega})|_{n^{th}\ row}\|_2 \end{bmatrix} \in R^{n \times 1}, \quad (15)$$

$$t(\omega) \begin{bmatrix} \|T(e^{j\omega})|_{1st\ row}\|_2 \\ \|T(e^{j\omega})|_{2nd\ row}\|_2 \\ \vdots \\ \|T(e^{j\omega})|_{n^{th}\ row}\|_2 \end{bmatrix} \in R^{n \times 1}, \quad (16)$$

$$r(\omega) \begin{bmatrix} \|R(e^{j\omega})|_{1st\ row}\|_2 \\ \|R(e^{j\omega})|_{2nd\ row}\|_2 \\ \vdots \\ \|R(e^{j\omega})|_{n^{th}\ row}\|_2 \end{bmatrix} \in R^{n \times 1}, \quad (17)$$

where $\|A_{ith\ row}\|_2$ denotes the vector 2-norm (Euclidean norm) of the $i^{th}$ row vector of matrix A. The reason for selecting the Euclidean norm is that it allows for summing up all channels. Practical control loop specifications are often applied to each measurement and each actuator. For example, the first row (a scalar) of the combined "sensitivity function" $s(\omega)$ in (15) reflects the gain between the disturbances from all channels (i.e., $d_1$ to $d_n$) and the first output $y_1$. The target peaks (the absolute maximum elements) of the above gain functions $s(\omega)$, $t(\omega)$, and $r(\omega)$ are defined as $M_s$, $M_t$, and $M_r$, respectively and the typical ranges for $M_s$, $M_t$, and $M_r$ are 1.3~1.8, 1.2~1.6, and 0.6~1.6, respectively. For example, $M_s = 1.3$ denotes up to 30% overshoot for any controlled variables at any frequency.

Based on the robust control theory, the closed-loop system in FIG. 4 is robustly stable for all plants $G_p(z)$ in (10) if it is nominally stable and satisfies the following condition:

$$\max_{\forall \omega} \bar{\sigma}(R(e^{j\omega})) = \|R(z)\|_\infty < \frac{1}{\beta} \leq \frac{1}{\|\Delta(z)\|_\infty} = \frac{1}{\max_{\forall \omega} \bar{\sigma}(\Delta(e^{j\omega}))}, \quad (18)$$

where $\|R\|_\infty$ denotes the H-infinity ($H_\infty$) norm which is equal to the maximum singular value of the control sensitivity function R(z) in (13), $\beta$ is form (10).

Automatic Tuning

The tuning objective is to find the weights $\Gamma$, $\Lambda$, and $\Phi$ in (4) such that the maximum peaks of the combined gain functions $s(\omega)$, $t(\omega)$, and $r(\omega)$ in (15)-(17) are equal, or have values that are as close as possible to their targets $M_s$, $M_t$, and $M_r$, respectively, subject to the robust stability condition (18).

The number of degrees of freedom in the selection of tuning parameters in (4) can be reduced by noting that, without loss of generality, the diagonal matrix $\Gamma$ in (4) may be fixed and the closed-loop performance may be modified via the diagonal matrices $\Lambda$ and $\Phi$. Typically, the diagonal weight matrix $\Phi$ (penalizing $U(k)-U_{sp}(k)$) significantly influences the steady-state performance. In light of this, the tuning problem can be separated into two stages: Tuning $\Phi$ first with the assumption that $\Lambda=0$ and then tuning $\Lambda$ second with a known $\Phi$.

Figure 5:
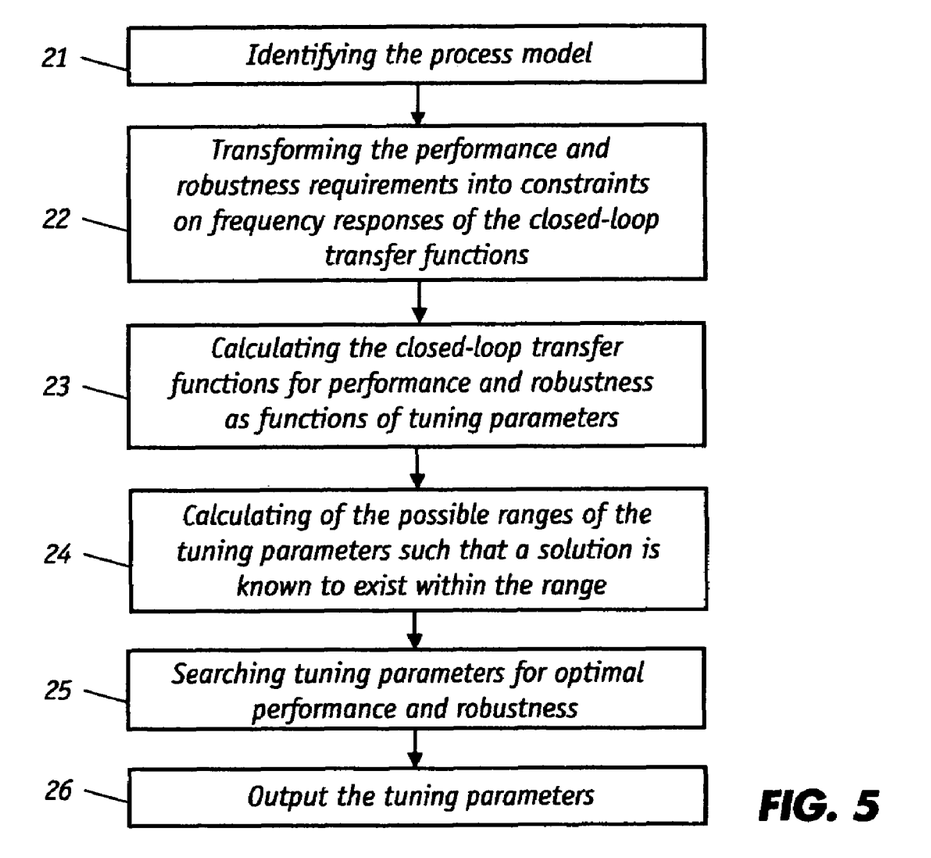
FIG. 5 is an automated tuning procedure for an MPC system.

FIG. 5 shows the general preferred steps of the tuning strategy which includes (i) forming the process model (step 21), (ii) transforming the performance and robustness requirements (step 22), (iii) calculating the closed-loop transfer functions (step 23), (iv) calculating the possible ranges of the tuning parameters (step 24), (v) searching the tuning parameters in the pre-calculating range (step 25), and (vi) obtaining the output of the tuning parameters (step 26). It should be noted that the inventive technique is not limited by the sequence that the steps are accomplished.

In practical it is preferred that the automatic MPC tuner is equipped with tuning knobs for the freedom of changing the controller's performance. It is not necessary to change the tuning knobs unless the user has special requirements on the controlled variables and manipulated variables, because the automatic tuning algorithm will provide good balanced performance. The term "balanced performance" is meant that the relative weights for all controlled variables and for all the manipulated variables are "ones".

Step 1: Tuning $\Phi$

In order to simplify the automatic tuning process and reduce the computation, a common weight $\rho$ is used for the weight $\Phi$. The user is free to set the relative weights as described below, $$\Phi = \rho \cdot \Phi^r = \rho \cdot diag(\phi_1^1, \phi_2^1, \ldots, \phi_m^1), \quad (19)$$

where $\phi_j^t$ with j=1 to m is the user-defined relative weights. From the previous discussion, the measurement weights are fixed except that the user-defined relative weights (representing the relative importance of controlled variables), $$\Gamma = \Gamma^t = diag(\gamma_1^t, \gamma_2^t, \ldots, \gamma_n^t). \quad (20)$$

It is known from above that the control sensitivity function $R(z)$ is a function of $\rho$. It is evident that from (4) and (19) $\rho=0$ is the most aggressive tuning number as the controller will not penalize the actuators away from its desired target positions. It is also not difficult to find a large enough number for $\rho$ such that $$\bar{\sigma}(R(1)|_\rho) < \frac{1}{\beta}, \text{ for all } \rho > \rho_{max}, \quad (21)$$

where $\beta$ represents the bound value of the model uncertainty defined in (10).

After the range of $\rho$ is known, the common weight $\rho$ for $\Phi$ can be solved by $$\min \rho \quad (22)$$

subject to: $\rho \in [0, \rho_{max}]$, $\quad (23)$ $$\bar{\sigma}(R(1)) < \frac{1}{\beta}. \quad (24)$$

Note that for a well-conditioned system $G(z)$, it is very likely that the common weight $\rho$ could be zero if the minimum singular value of the system $\underline{\sigma}(G(1))>\beta$, as $R(1)=G(1)^{-1}$ when $\rho=0$.

Step 2: Tuning $\Lambda$

The desired peaks $M_s$ and $M_t$ of the combined gain functions $s(\omega)$ and $t(\omega)$ in (15)-(16) can be translated from the disturbance rejection and set point tracking requirements. The user is free to change these two peaks based on the performance requirements. In order to obtain realistic actuation, another peak limit $M_r$ is set up for the combined control sensitivity function $r(\omega)$ in (17).

Similarly, a common penalty weight $\alpha$ is used for the weight matrix $\Lambda$ as follows, $$\Lambda = \alpha \cdot \Lambda^t = \alpha \cdot diag(\lambda_1^t, \lambda_2^t, \ldots, \lambda_m^t), \quad (25)$$

where $\lambda_j^t$ with j=1 to m is the user-defined relative weights based on special requirements for particular manipulated variables.

From (4) and (25), the most aggressive number for $\alpha$ is $\alpha=0$. The most robust number is to find $\alpha_{max}$ such that $$|s(\omega)|_{max} \le \kappa, \quad (26)$$

$$\bar{\sigma}(R(e^{j\omega})|_\alpha) < \frac{1}{\beta}, \text{ for all } \alpha > \alpha_{max}, \quad (27)$$

where $|s(\omega)|_{max}$ denotes the maximum element or the largest peak of $s(\omega)$, $\kappa$ is a lower bound of the largest allowable peak of the combined sensitivity function $s(\omega)$ in (15) designed for the most conservative (robust) controller and typically $\kappa$ is much smaller than the target peak $M_s$ of $s(\omega)$.

After solving $\alpha_{max}$, the tuning goal for $\Lambda$ is to find $\alpha$ such that $$\max_{\forall \omega}\left(\min_{\omega(k)} \alpha\right) \quad (28)$$

subject to: $\alpha \in (0, \alpha_{max}]$, $\quad (29)$ $$\bar{\sigma}(R(e^{j\omega})) < \frac{1}{\beta}, \forall \omega, \quad (30)$$

$$\max_{\forall \omega}(|s(\omega(k))|_{max}) \le M_s, \quad (31)$$

$$\max_{\forall \omega}(|t(\omega(k))|_{max}) \le M_t, \quad (32)$$

$$\max_{\forall \omega}(|r(\omega(k))|_{max}) \le M_r, \quad (33)$$

where $\omega(k)$ are $k_{max}$ logarithmically or linearly equally spaced points form 0 to the Nyquist frequency, $|\alpha|_{max}$ denotes the maximum element of the vector $\alpha$, the right hand sides of (31), (32), (33) are to calculate the largest peaks of $s(\omega)$, $t(\omega)$, $r(\omega)$ in (15), (16), and (17) respectively.

Figure 6A:
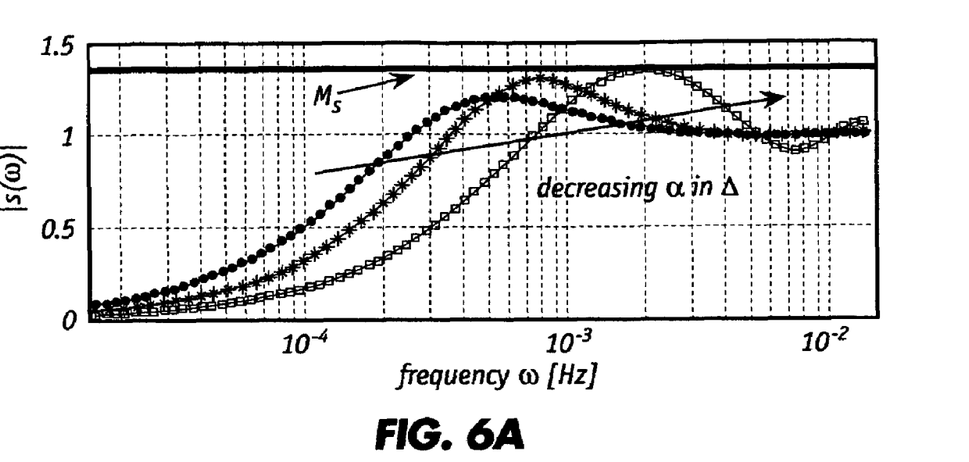
FIGS. 6A and 6B are graphs that illustrate how changing the tuning weight Λ affects the closed-loop transfer functions.
Figure 6B:
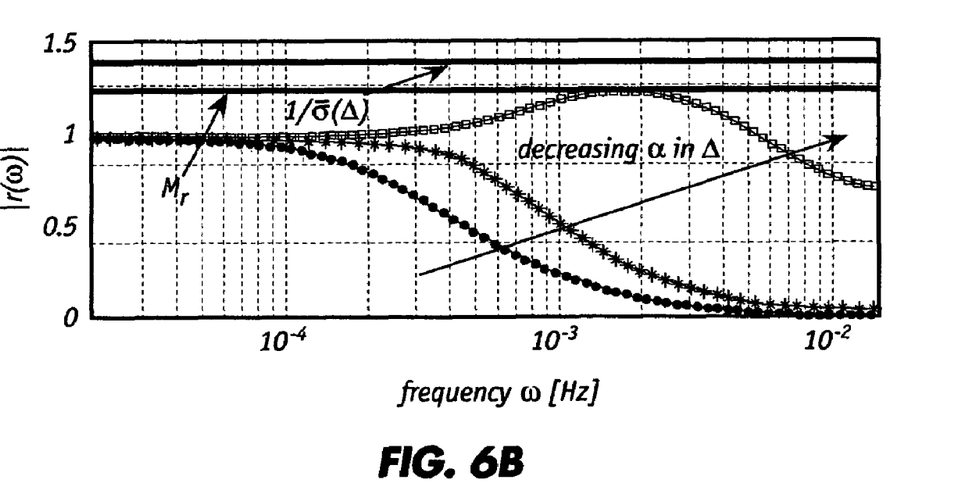

The effect of changing one of the tuning parameters $\Lambda$ in (4) on the closed-loop functions was demonstrated. Specifically, FIGS. 6A and 6B show the effects of changing $\Lambda$ in the quadratic programming problem (4) on the combined sensitivity function s(ω) in (15) (FIG. 6A) and the combined control sensitivity function r(ω) (17). As shown in FIG. 6A, decreasing the common weight α of Λ in (25) affects the shape and peak of combined sensitivity function which represent the controller's performance. As shown in FIG. 6B, decreasing the common weight α of Λ impacts the combined control sensitivity function which can be used to evaluate the controller's robustness through the robust stability condition (18) and limit the actuation without being over the target $M_r$.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of automarically tuning a multivariable model predictive controller (MPC) for a multivariable process that comprises the steps of:
   (a) identifying a process model for the multivariable process;
   (b) scaling inputs, which are manipulated variables, and outputs, which are controlled variables, of the process model;
   (c) calculating closed-loop transfer functions for performance and robustness as functions of tuning parameters for the MPC wherein the process model is used to calculate the closed-loop transfer functions or gain functions;
   (d) identifying at least one performance requirement for the MPC and transforming the at least one performance requirement into constraints on frequency responses of the closed-loop transfer functions or gain functions;
   (e) identifying at least one robustness requirement for the MPC and transforming the at least one robustness requirement into constraints on frequency responses of the closed-loop transfer functions or gain functions;
   (f) calculating possible ranges of tuning parameters such that a solution is known to exist within the range;
   (g) determining optimal tuning parameters with respect to performance and robustness; and
   (h) automatically yielding tuning parameters for the MPC based on performance and robustness requirements.

2. The method of claim 1 wherein step (g) comprises generating tuning parameters such that performance is optimized and at least one robust stability condition is satisfied.

3. The method of claim 1 wherein optimal actuator positions for the MPC are determined by solving an object function that employs weights in the form of positive semi-definite matrices and wherein in step (g) values for the weights.

4. The method of claim 3 wherein the MPC is approximated as a linear unconstrained controller, which is characterized by a constant prefilter matrix K, and complex transfer matrix K(z), and closed-loop transfer functions employed are calculated to satisfy the three closed-loop requirements which are characterized as disturbance rejection requirements, set point tracking requirements, and a closed-loop system that are given as (C1),(C2), and (C3) as follows:

$$S(z) = (I + G(z)K(z))^{-1}, \quad (C1)$$

$$T(z) = (I + G(z)K(z))^{-1} G(z)K(z)K_r, \quad (C2)$$

$$R(z) = -K(z)(I + G(z)K(z))^{-1}, \quad (C3)$$

wherein S(z) is the sensitivity function linking disturbances d and outputs y, T(z) is the closed-loop transfer function linking the targets $y_{sp}$ and the outputs y, R(z) is the control sensitivity function linking the disturbances d and the actuators u, and wherein the closed-loop transfer functions S(z), T(z), and R(z) are functions of the tuning parameters Γ, Λ, and Φ.

5. The method of claim 4 wherein in step (g) of determining optimal tuning parameters the values of the weights are determined by employing the following gain functions:

$$s(\omega) = \begin{bmatrix} \|S(e^{j\omega})|_{1st\ row}\|_2 \\ \|S(e^{j\omega})|_{2nd\ row}\|_2 \\ \vdots \\ \|S(e^{j\omega})|_{nth\ row}\|_2 \end{bmatrix} \in R^{n \times 1}, \quad (C4)$$

$$t(\omega) = \begin{bmatrix} \|T(e^{j\omega})|_{1st\ row}\|_2 \\ \|T(e^{j\omega})|_{2nd\ row}\|_2 \\ \vdots \\ \|T(e^{j\omega})|_{nth\ row}\|_2 \end{bmatrix} \in R^{n \times 1}, \quad (C5)$$

$$r(\omega) = \begin{bmatrix} \|R(e^{j\omega})|_{1st\ row}\|_2 \\ \|R(e^{j\omega})|_{2nd\ row}\|_2 \\ \vdots \\ \|R(e^{j\omega})|_{nth\ row}\|_2 \end{bmatrix} \in R^{n \times 1}, \quad (C6)$$

wherein $\|A_{ith\ row}\|_2$ denotes the vector 2-norm (Euclidean norm) of the $i^{th}$ row vector of matrix A, and characterized in that the target peaks (the maximum elements) of the gain functions s(ω), t(ω), and r(ω) are defined as $M_s$, $M_t$, and $M_r$, respectively, ω is a parameter representing the frequency, S(z), T(z), and R(z) with $z = e^{j\omega}$ are from (C1), (C2), and (C3), n and m designate numbers of controlled variables y and manipulated variables u respectively.

6. The method of claim 5 wherein step (g) of determining the optimal tuning parameters comprises determining the value of the weights by comparing the maximum peaks of the combined gain functions s(ω), t(ω), and r(ω) in (C4), (C5), and (C6) to their targets $M_s$, $M_t$, and $M_r$, respectively, subject to a robust stability condition.

7. The method of claim 6 wherein step (g) of determining the optimal tuning parameters comprises determining the value of the weights by comparing the maximum peaks of the closed-loop transfer functions S(z), T(z), and R(z) in (C1), (C2), and (C3) to their targets $M_s$, $M_t$, and $M_r$, respectively, subject to a robust stability condition.

8. The method of claim 1 wherein the MPC employs an object function of the form:

$$\min_{\Delta u(k), \ldots, \Delta(k+H_c-1)} \sum_{i=1}^{H_p} \|\hat{y}(k+i) - y_{sp}(k+i)\|_\Gamma^2 + \sum_{j=0}^{H_c-1} \|\Delta u(k+j)\|_\Lambda^2 + \|u(k+j) - u_{sp}(k+j)\|_\Phi^2 \quad (C7)$$

subject to: $\Lambda \Delta u(k) < b - Cu(k-1)$ \quad (C8)

$y(k) = G(q)u(k) + d(k)$ \quad (C9)

where $y_{sp}$ is comprised of the reference signals, $u_{sp}$ is comprised of desired actuator positions, $H_p$ and $H_c$ are prediction horizon and control horizon, respectively, $\|x\|_\Gamma^2$ denotes the weighted Euclidean norm of x defined as $\|x\|_\Gamma^2 = x^T \Gamma x$; $\Delta u(k) = (1-q^{-1})u(k) = u(k) - u(k-1)$, where q is the shift operator; weights $\Gamma$, $\Lambda$, and $\Phi$ are positive semi-definite matrices that include the following diagonal matrices:

$$\Gamma = \mathrm{diag}(\gamma_1, \gamma_2, \ldots, \gamma_n), \quad (C10)$$

$$\Lambda = \mathrm{diag}(\lambda_1, \lambda_2, \ldots, \lambda_m), \quad (C11)$$

$$\Phi = \mathrm{diag}(\phi_1, \phi_2, \ldots, \phi_m). \quad (C12)$$

9. The method of claim 8 wherein step (g) of determining the optimal tuning parameters employs the weights $\Gamma$, $\Lambda$, and $\Phi$ in determining the optimal tuning parameters while satisfying the following three closed-loop requirements: (i) disturbance rejection requirement, (ii) set point tracking requirement, and (iii) the closed-loop system given by (C7), (C8), and (C9) is stable in the face of model uncertainty.

10. The method of claim 9 wherein the MPC is approximated as a linear unconstrained controller, which is characterized by a constant prefilter matrix $K_r$ and complex transfer matrix $K(z)$, and closed-loop transfer functions employed are calculated to satisfy the previously defined three closed-loop requirements as follows:

$$S(z) = (I + G(z)K(z))^{-1}, \quad (C1)$$

$$T(z) = (I + G(z)K(z))^{-1} G(z)K(z)K_r, \quad (C2)$$

$$R(z) = -K(z)(I + G(z)K(z))^{-1}, \quad (C3)$$

wherein $S(z)$ is the sensitivity function linking disturbances d and outputs y, $T(z)$ is the closed-loop transfer function linking the targets $y_{sp}$ and the outputs y, $R(z)$ is the control sensitivity function linking the disturbances d and the actuators u, and wherein the closed-loop transfer functions $S(z)$, $T(z)$, and $R(z)$ are functions of the tuning parameters $\Gamma$, $\Lambda$, and $\Phi$.

11. The method of claim 10 wherein the closed-loop system is robustly stable for all plants $G_p(z)$ if it is nominally stable and satisfies the following condition:

$$\max_{\forall \omega} \overline{\sigma}(R(e^{j\omega})) = \|R(z)\|_\infty < \frac{1}{\beta} \le \frac{1}{\|\Delta(z)_\infty\|} = \frac{1}{\max_{\forall \omega} \overline{\sigma}(\Delta(e^{j\omega}))}, \quad (C13)$$

where $\|R\|_\infty$ denotes the H-infinity norm which is equal to the maximum singular value of the control sensitivity function $R(z)$ in (C3), $\beta$ and $\Delta(z)$ are from the plant with additive model uncertainty $G_p(z)$ defined by $$G_p(z) \in \Pi := \left\{ G(z) + \Delta(z): \max_{\forall \omega} \overline{\sigma}(\Delta(e^{j\omega})) \le \beta \right\}, \quad (C14)$$

where $\overline{\sigma}$ denotes the maximum singular value, $z = e^{j\omega}$ and the symbol $\omega$ represents the dynamical frequency, the symbol '$\forall \omega$' means for all the frequencies.

12. The method of claim 11 wherein a maximum singular value of $R(z)$ is employed for satisfying a robust stability condition.

13. The method of claim 12 wherein the closed-loop system is represented in the form of gain functions that as follows:

$$s(\omega) = \begin{bmatrix} \|S(e^{j\omega})\|_{1st\ row}\|_2 \\ \|S(e^{j\omega})\|_{2nd\ row}\|_2 \\ \vdots \\ \|S(e^{j\omega})\|_{n^{th}\ row}\|_2 \end{bmatrix} \in R^{n \times 1}, \quad (C4)$$

$$t(\omega) = \begin{bmatrix} \|T(e^{j\omega})\|_{1st\ row}\|_2 \\ \|T(e^{j\omega})\|_{2nd\ row}\|_2 \\ \vdots \\ \|T(e^{j\omega})\|_{n^{th}\ row}\|_2 \end{bmatrix} \in R^{n \times 1}, \quad (C5)$$

$$r(\omega) = \begin{bmatrix} \|R(e^{j\omega})\|_{1st\ row}\|_2 \\ \|R(e^{j\omega})\|_{2nd\ row}\|_2 \\ \vdots \\ \|R(e^{j\omega})\|_{n^{th}\ row}\|_2 \end{bmatrix} \in R^{n \times 1}, \quad (C6)$$

wherein $\|A_{ith\ row}\|_2$ denotes the vector 2-norm (Euclidean norm) of the $i^{th}$ row vector of matrix A, and characterized in that the target peaks (the maximum elements) of the gain functions $s(\omega)$, $t(\omega)$, and $r(\omega)$ are defined as $M_s$, $M_t$, and $M_r$, respectively.

14. The method of claim 13 wherein step (g) of determining the optimal tuning parameters comprises determining the weights $\Gamma$, $\Lambda$, and $\Phi$ in (C7) by comparing the maximum peaks of the combined gain functions $s(\omega)$, $t(\omega)$, and $r(\omega)$ in (C4), (C5), and (C6) to their targets $M_s$, $M_t$, and $M_r$, respectively, subject to the robust stability condition (C13).

15. The method of claim 8 wherein step (g) of determining the optimal tuning parameters uses common weights $\rho$ for $\Lambda$ and $\alpha$ for $\Phi$ to determine the tuning weights $\Lambda$ and $\Phi$, respectively, in (C7), where common weights $\rho$ and $\alpha$ are defined as $$\Phi = \rho \cdot \mathrm{diag}(\phi_1^t, \phi_2^t, \ldots, \phi_m^t), \quad (C15)$$

$$\Lambda = \alpha \cdot \mathrm{diag}(\lambda_1^t, \lambda_2^t, \ldots, \lambda_m^t), \quad (C16)$$

where $\phi_j^t$ and $\lambda_j^t$ with $j = 1, \ldots, m$ are relative weights for each manipulated variable $u_j$.

16. The method of claim 8 wherein step (g) of determining the optimal tuning parameters determine the tuning weight $\Phi$ first and the tuning weight $\Lambda$ second.

* * * * *